W. TSCHUDY & S. W. FARNSWORTH.
VOLTAGE REGULATING SYSTEM FOR VAPOR RECTIFIERS.
APPLICATION FILED FEB. 19, 1914.
1,257,426. Patented Feb. 26, 1918.
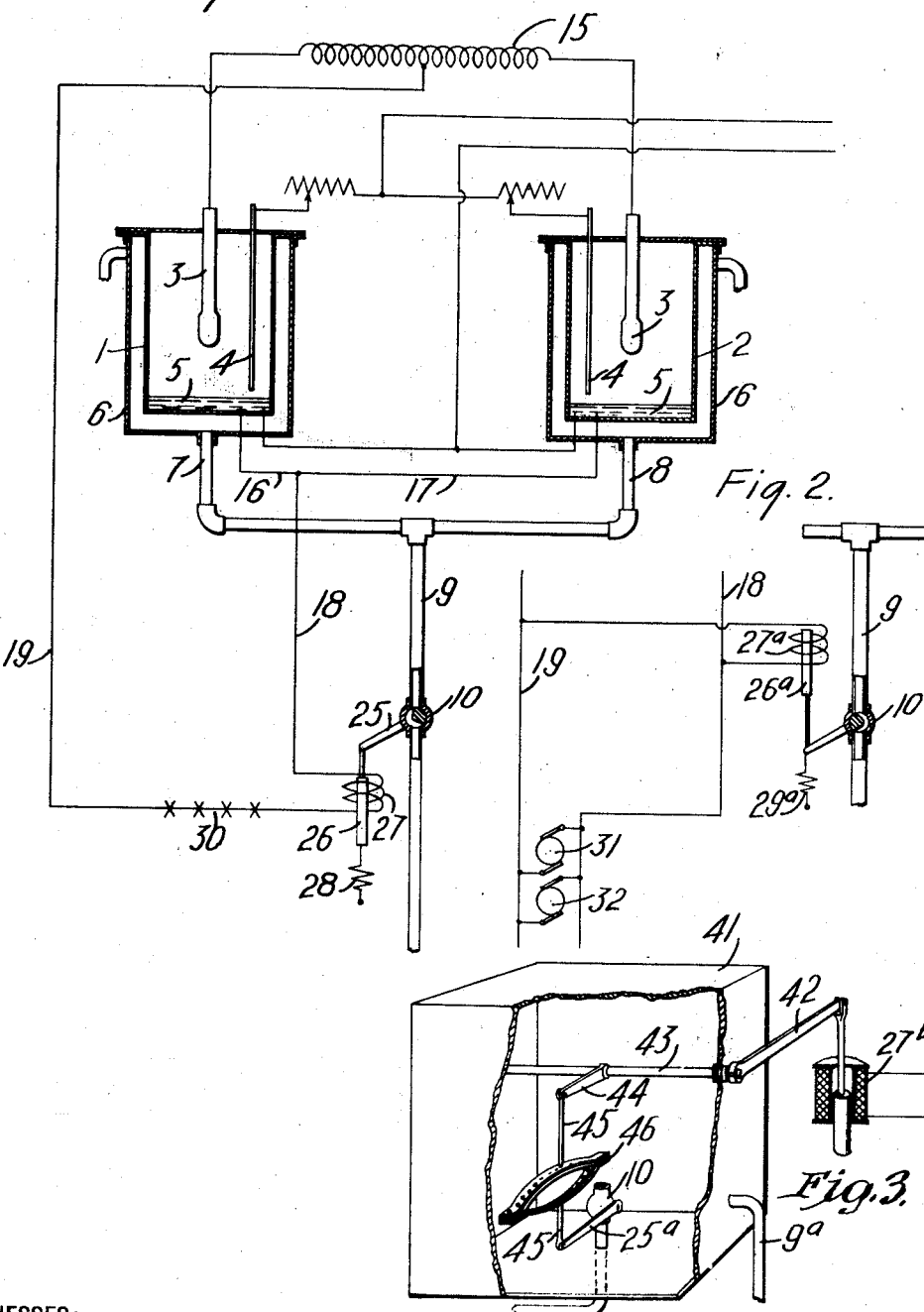
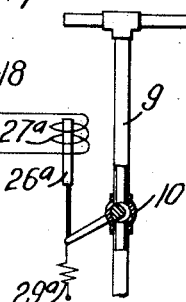
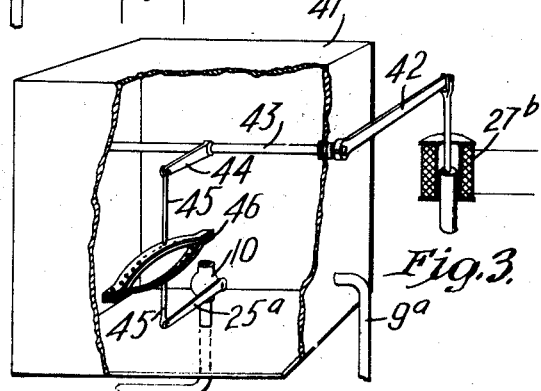
WITNESSES:
Fred A. Lind
R. D. Brown
INVENTORS
William Tschudy
& Sidney W. Farnsworth
BY
Wesley G. Carr
ATTORNEY

UNITED STATES PATENT OFFICE.

WILLIAM TSCHUDY, OF WILKINSBURG, AND SIDNEY W. FARNSWORTH, OF PITTSBURGH, PENNSYLVANIA, ASSIGNORS TO WESTINGHOUSE ELECTRIC AND MANUFACTURING COMPANY, A CORPORATION OF PENNSYLVANIA.

VOLTAGE-REGULATING SYSTEM FOR VAPOR-RECTIFIERS.

1,257,426.   Specification of Letters Patent.   Patented Feb. 26, 1918.

Application filed February 19, 1914. Serial No. 819,691.

*To all whom it may concern:*

Be it known that we, WILLIAM TSCHUDY, a citizen of the Swiss Republic, and a resident of Wilkinsburg, in the county of Allegheny and State of Pennsylvania, and SIDNEY W. FARNSWORTH, a citizen of the United States, and a resident of Pittsburgh, in the county of Allegheny and State of Pennsylvania, have invented a new and useful Improvement in Voltage - Regulating Systems for Vapor-Rectifiers, of which the following is a specification.

Our invention relates to current-rectifying systems and it has particular reference to such systems as embody vapor rectifiers of large capacity.

The object of our invention is to provide novel and effective means for regulating the voltage, in the direct-current circuit to which the rectifier supplies current, while the voltage in the alternating-current supply circuit remains constant.

In the accompanying drawing, Figure 1 is a diagrammatic view of a system embodying our invention; Fig. 2 is a diagrammatic view of a portion of the system shown in Fig. 1, illustrating a modified form of load connection; and Fig. 3 is a partly broken perspective view of a thermostatic control device that may be included in our system.

The rectification of alternating currents by means of a vapor rectifier is attended by a drop in potential across the rectifier, and we have discovered that the amount of this drop is dependent upon the temperature at which the rectifier cathode is maintained. The drop in potential increases as the temperature is lowered, and it may be stated, in a general way, that the amount of potential drop varies inversely with the cathode temperature. It is customary, when a metal case rectifier is employed, to supply water or other cooling fluid to the casing, and the amount of potential drop across the rectifier may be regulated by varying the temperature, or the amount of the cooling medium so supplied. For example, we have found that, in a rectifier delivering a direct current of 200 amperes, the voltage drop when the cooling water is supplied at 27° C. is 20 volts, while, when the cooling water is supplied at 56° C., the drop is only 12 volts. The temperature of the anode is the same under both conditions, though other tests have shown that the drop is not affected by changes in the temperature of the anode, if the cathode temperature remains constant.

We have taken advantage of this variation in voltage drop with variation in the cathode temperature to obtain regulation of the direct-current voltage, and current when the alternating current is supplied at a constant voltage.

Referring now to Fig. 1 of the drawing, two single unit rectifier tanks 1 and 2 are shown, each containing a main anode 3, an auxiliary maintaining or keep-alive anode 4, and a vaporizable cathode 5. Each tank is surrounded by a second tank or jacket 6, spaced therefrom, means being provided for introducing a cooling fluid, such as water, into the space between the tanks. As shown on the drawing, the fluid supplying means comprises pipes 7 and 8 leading respectively to the jackets surrounding the rectifiers 1 and 2 and a supply pipe 9 having a valve 10.

Alternating current is supplied to the rectifier units from any convenient source 15, which may be the secondary winding of a transformer, and the direct current from the rectifiers is delivered by conductors 16, 17 and 18 to an external work circuit that is connected, by a conductor 19, to the middle point of the transformer winding 15.

The valve 10 is opened and closed by a lever 25 which is operatively connected to the movable core 26 of a coil 27. The coil 27 is connected in series with the direct-current conductor 18. A spring 29 is attached to the solenoid core 26 and tends to hold the core in such position that the valve 10 shall be closed.

The direct-current circuit may include any suitable translating devices. For purposes of illustration, we have shown a series of arc lamps 30 as constituting a variable direct-current load.

It will be understood that the direct current delivered by the rectifiers will energize the solenoid 27 to draw its core 26 upwardly to a greater or less extent, according to the amount of current supplied to the solenoid. This movement of the core 26 will effect the opening of the valve 10 to a corresponding degree. Water will therefore be supplied to the rectifier jackets in greater amounts, as the current in the direct current circuit increases, and in less amounts as this current decreases. The variation in the water supply and the consequent alteration in the cathode temperature will cause a corresponding variation in the voltage drop across the rectifier. The series connection of the solenoid 27, shown in Fig. 1, is especially desirable for work where constant current is to be maintained in the direct-current circuit.

The system shown in Fig. 1 may be varied by connecting the different elements of the load in parallel relation, instead of in series relation. Such an arrangement is shown in Fig. 2, in which a solenoid coil 27$^a$, when energized, pulls a core 26$^a$ against the tension of a spring 29$^a$, and in which motors 31 and 32 are shown connected across the direct-current circuit. This arrangement is especially advantageous when it is desired to maintain constant potential in the direct-current circuit under varying conditions of current consumption.

Advantage may be taken of the systems which we have shown either to maintain a constant current in the direct-current circuit or to maintain a constant voltage in the direct-current circuit, with a varying load. If, for example, it is desired to supply a variable series of constant-current devices such as the arc lamps 30 of the Fig. 1, it will be necessary to increase the applied direct-current voltage in order to provide a constant current for the lamps as the resistance is increased by increasing the number of lamps in circuit. This may be accomplished in our system, because, as the resistance increases in the circuit that includes lamps, the current through the solenoid 27 is decreased and the valve correspondingly partly closed to check the flow of water to the rectifiers. The cathode temperature therefore rises, the voltage drop across the rectifier decreases, and the applied direct-current voltage is increased proportionately.

If it is desired to maintain a constant voltage in the direct-current circuit while translating devices, such for example, as the motors 31 and 32, Fig. 2, are taking current in varying amounts, the solenoid 27$^a$ will be energized less strongly when both the motors are operating than when only one motor is operating, and the valve 10 will consequently be opened wider, thus increasing the supply of cooling water. If this increase in water supply were directly proportional to the increase in current, the heat generated in the rectifier by the increased current would be dissipated at the same rate as before, and the voltage drop across the rectifier would therefore remain substantially constant. It is necessary, therefore, that the solenoid or the valve shall be so designed that the flow of water will increase at a somewhat slower rate than that at which the current increases, so that the cathode may be slowly heated, thus reducing the voltage drop across the rectifier and allowing the applied direct-current voltage to be gradually increased at the desired rate.

The systems shown in Figs. 1 and 2 will effect automatic adjustment of the electrical condition of the direct-current circuit in the manner described above, provided the cooling medium supplied to the cathode is always of the same temperature. However, when water is used as a cooling medium, its temperature is likely to vary with the season of the year or with a change in the weather at any season. It may therefore be found desirable to provide means for compensating for these changes in the temperature of the feed water, and we have shown a suitable device of this character in Fig. 4 of the drawing, in which the valve 10 is inclosed in a chamber 41 from which the feed water passes through a pipe 9$^a$ and through any suitable intermediate pipe connections to the rectifier jackets 6. The valve-operating lever 25$^a$ is oscillated by a solenoid 27$^b$ through a lever 42, a shaft 43, a lever 44, a two-part connecting rod 45 and a bi-metallic thermo-couple 46 that is interposed between the two parts of the rod 45. It will be readily understood that any change in the temperature of the feed water delivered to the chamber 41 will cause a corresponding variation in the shape of the bi-metallic couple 46. For example, if the feed water should increase in temperature, the curvature of the couple shown on the drawing would be correspondingly increased, thus in effect increasing the effective length of the rod 45 and causing the valve to open slightly, to increase the supply of feed water in proportion to the rise in temperature.

The thermostatic control device which we have shown and described forms no part of our invention, and is fully set forth and claimed in a co-pending application of David C. Davis, Serial No. 834,543, filed April 25, 1914, and assigned to Westinghouse Electric & Manufacturing Company.

Our system is capable of many variations within the scope of our invention. For example, it may include either single-unit or multiple unit rectifiers, and the rectifiers may be supplied with either single-phase or polyphase alternating current. Furthermore, means other than the solenoid control, which we have shown, may be employed to regulate the supply of cooling fluid, our invention comprehending broadly all devices for varying the supply of cooling fluid in response to variations of current or voltage in the direct-current circuit.

We claim as our invention:

1. A rectifier system comprising a source of constant-potential alternating current, a vapor rectifier having a cathode adapted to be cooled to a variable extent, a circuit connected to receive direct current from the rectifier, and means dependent upon the direct-current circuit for supplying a cooling medium to the rectifier cathode in varying amounts.

2. A rectifier system comprising a source of constant-potential alternating current, a vapor rectifier provided with a cooling jacket, means for introducing a cooling medium into the said jacket, a valve for regulating the amount of cooling medium so introduced, a circuit connected to receive direct current from the rectifier, and means dependent upon the direct current circuit for operating the said valve.

3. A rectifier system comprising a source of constant-potential alternating current, a vapor rectifier provided with a cooling jacket, means for introducing a cooling medium into the said jacket, a valve for controlling the amount of cooling medium so introduced, a circuit connected to receive direct current from the rectifier and including a solenoid, and means for applying the power of the solenoid to the valve.

4. A rectifier system comprising a source of constant-potential alternating current, a vapor rectifier provided with a cooling jacket, means for introducing a cooling medium into the said jacket, a valve for controlling the amount of cooling medium so introduced, a circuit connected to receive direct current from the rectifier and including a solenoid, and means for applying the power of the solenoid to the valve, whereby the valve is caused to open as the current in the direct current circuit increases and to close as the current in the direct current circuit decreases.

5. A rectifier system comprising a source of constant-potential alternating current, a vapor recifier, means for applying a cooling medium to the cathode of the rectifier, a circuit connected to receive direct current from the rectifier and including a load having variable resistance, and means dependent upon the current in the direct-current circuit for keeping constant the current delivered to the load by varying the supply of said cooling medium.

6. The combination with a vapor rectifier, of voltage-regulating means associated therewith and functioning by virtue of the cathode temperature and resultant arc drop.

7. The combination with a vapor rectifier, of a load circuit connected thereto, and means for regulating the arc drop therein, said means being subject to the control of said load circuit.

8. The method of regulating an electric circuit supplied from a vapor rectifier which comprises regulating the voltage drop in said rectifier in accordance with the current in said circuit.

In testimony whereof, we have hereunto subscribed our names this 14th day of Feb., 1914.

WILLIAM TSCHUDY.
SIDNEY W. FARNSWORTH.

Witnesses:
DAVID E. CARPENTER,
B. B. HINES.